US006809429B1

(12) United States Patent
Frank

(10) Patent No.: US 6,809,429 B1
(45) Date of Patent: Oct. 26, 2004

(54) CONTROL METHOD AND APPARATUS FOR INTERNAL COMBUSTION ENGINE ELECTRIC HYBRID VEHICLES

(75) Inventor: Andrew A. Frank, El Macero, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/677,288

(22) Filed: Oct. 2, 2000

Related U.S. Application Data

(63) Continuation of application No. PCT/US99/09880, filed on Apr. 19, 1999, which is a continuation-in-part of application No. 09/063,993, filed on Apr. 21, 1998, now Pat. No. 6,054,844.

(51) Int. Cl.[7] .............................. F02M 11/06; H02P 9/04; B60K 6/00
(52) U.S. Cl. ................................. 290/40 C; 180/65.2
(58) Field of Search .......................... 290/40 C, 40 R, 290/45; 322/16; 180/65.2

(56) References Cited

U.S. PATENT DOCUMENTS

| | | | | |
|---|---|---|---|---|
| 4,407,132 A | * | 10/1983 | Kawakatsu et al. | 180/65.4 |
| 4,445,329 A | * | 5/1984 | Drisko | 60/431 |
| 4,470,476 A | * | 9/1984 | Hunt | 180/65.2 |
| 4,947,953 A | * | 8/1990 | Morimoto | 180/179 |
| 5,002,020 A | * | 3/1991 | Kos | 123/46 |
| 5,327,987 A | * | 7/1994 | Abdelmalek | 180/65.2 |
| 5,345,154 A | * | 9/1994 | King | 318/49 |
| 5,495,906 A | * | 3/1996 | Furutani | 180/65.2 |
| 5,722,911 A | * | 3/1998 | Ibaraki et al. | 180/65.3 |
| 5,786,640 A | * | 7/1998 | Sakai et al. | 290/17 |
| 5,788,004 A | | 8/1998 | Friedmann et al. | |
| 5,789,882 A | * | 8/1998 | Ibaraki et al. | 180/65.3 |
| 5,806,617 A | * | 9/1998 | Yamaguchi | 180/65.2 |
| 5,839,533 A | * | 11/1998 | Mikami et al. | 180/165 |
| 5,841,201 A | | 11/1998 | Tabata et al. | |
| 5,842,534 A | * | 12/1998 | Frank | 180/65.2 |
| 5,846,155 A | * | 12/1998 | Taniguchi et al. | 477/2 |
| 5,875,864 A | * | 3/1999 | Yano et al. | 180/65.4 |
| 5,899,286 A | * | 5/1999 | Yamaguchi | 180/65.1 |
| 6,054,844 A | | 4/2000 | Frank | 322/16 |
| 6,090,007 A | * | 7/2000 | Nakajima et al. | 477/46 |
| 6,098,733 A | * | 8/2000 | Ibaraki et al. | 180/65.2 |
| 6,110,066 A | * | 8/2000 | Nedungadi et al. | 475/5 |
| 6,116,363 A | | 9/2000 | Frank | 180/65.2 |
| 6,344,732 B2 | * | 2/2002 | Suzuki | 180/65.1 |

FOREIGN PATENT DOCUMENTS

EP     0 423 536 A1    4/1991

OTHER PUBLICATIONS

Brace et al., "Operating Point Optimiser for Integrated Diesel/CVT Powertrain", Ford Motor Company, Application of Powertrain and Fuel Technologies to Meet Emissions Standards for the 21st Century, Seminar code C517, Jun. 24–26, 1996, pp. 1–8.
Brace et al., "Integrated Passenger Car Diesel CVT Powertrain Control for Economy and Low Emissions", Ford Motor Company, IMechE International Seminar S540 'Advanced Vehicle Transmissions and Powertrain Management', Sep. 25–26, 1997, pp. 1–8.

(List continued on next page.)

Primary Examiner—Nestor Ramirez
Assistant Examiner—Julio Cesar Gonzalez
(74) Attorney, Agent, or Firm—John P. O'Banion

(57) ABSTRACT

A method and apparatus for controlling the power output of an internal combustion engine in a vehicle, wherein a motor/generator or a generator/motor is coupled to the output shaft of the engine and the positive and negative torque of the motor/generator or the generator/motor is varied to control the power output of the engine as a function of speed for all manners of performance of the vehicle. The engine operates along a predetermined ideal operating line at all speeds of the vehicle.

19 Claims, 9 Drawing Sheets

OTHER PUBLICATIONS

Yang et al., "On the use of Engine Modulation for Decelearation Control of Continuously Variable Transmission Vehicles", Society of Automotive Engineers, Inc., Technical Paper 850490, pp. 3.636 to 3.653, 1986.

Chan et al., "System Design and Control Considerations of Automotive Continuously Variable Transmissions", Society of Automotive Engineers, Inc., Technical Paper 840048, Feb. 1984.

Yang et al., An optimization technique for the design of a continuously variable transmission control system for automobiles, Int. J. of Vehicle Design, vol. 6, No. 1, Jan. 1985.

Yang et al., "Control and Response of Continuously Variable Tranmission (CVT) Vehicles", University of Wisconsin, undated.

* cited by examiner

CONTROL METHOD AND APPARATUS FOR INTERNAL COMBUSTION ENGINE ELECTRIC HYBRID VEHICLES

CROSS-REFERENCE TO RELATED APPLICATIONS

This application claims priority from, and is a 35 U.S.C. §111 (a) continuation of, co-pending PCT international application serial number PCT/US99109880 filed on Apr. 19, 1999 which designates the U.S., which is a continuation-in-part of U.S. application Ser. No. 09/063,993 filed on Apr. 21, 1994, now U.S. Pat. No. 6,054,844, from which priority is also claimed.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to vehicle power trains and transmissions, and more particularly to a method and apparatus for controlling the operating characteristics of an internal combustion engine coupled to a drive train having a mechanical or electrical continuously variable transmission or a standard automatic transmission.

2. Description of the Background Art

The concept of an engine and a "continuously variable transmission" is a very old concept invented in the 1900's, but the theoretical efficiency of the engine, performance and driveability could never be obtained automatically. This can be seen with reference to the conventional power train and transmission shown in FIG. 1 where an internal combustion engine 10 has an output shaft 12 that drives a decoupling/starting clutch or torque converter 14, which is in turn coupled to the input shaft 16 of a continuously variable transmission (CVT) or automatic transmission (AT) 18, which in turn has an output driving a drive shaft or differential 20 coupled to a final drive wheel 22 (e. g. , axle and tire). The deficiencies of such a configuration are caused by the dynamic equation representing the engine/CVT system:

$$\alpha_{DS} = \frac{-\overset{\circ}{R} I_E S_E + T_E R - T_{loss} - T_{RL}}{I_{DS} + R^2 I_E},$$

$$\overset{\circ}{R} = \frac{dR}{dt}$$

where $\alpha_{DS}$=acceleration of the vehicle reflected to the drive shaft, $$R = \frac{S_E}{S_{DS}},$$

$I_E$=engine inertia, $I_{DS}$=vehicle inertia at the driveshaft, $S_E$=engine speed, $S_{DS}$=drive shaft speed, $T_E$=engine torque, $T_{loss}$=torque losses, and $T_{RL}$=road load torque at the driveshaft. Because the first term $-\overset{\circ}{R} I_E S_E$ and the second term $T_E R$ generally oppose each other, the acceleration of the car and the torque and speed of the engine are difficult to control simultaneously. As a result, the best efficiency and minimum emissions for a gasoline or diesel engine cannot be realized without a sacrifice in performance. This can be seen with further reference to FIG. 2 and FIG. 3 which show operating characteristics of the engine as a function of engine speed and torque, where WOT=wide open throttle and denotes the maximum torque line, IOL=ideal torque/speed operating line and denotes where the best efficiency and/or least emissions (minimum brake specific fuel consumption or BSFC) occurs, and POL=practical operating line due to engine/transmission characteristics. Note in FIG. 3 that point A is less efficient than point B but must be used to provide proper vehicle behavior (transient performance).

BRIEF SUMMARY OF THE INVENTION

The foregoing deficiencies can be overcome in accordance with the present invention by inserting an electric motor or motor/generator, a battery, and associated controls between the engine and the continuously variable or automatic transmission. It will be appreciated that when the term "battery" is used herein, the term can include any energy storage device such as an ultra capacitor, electrochemical battery, or the like.

In the preferred embodiment, a motor/generator is controlled to counteract the negative effect of the $-\overset{\circ}{R} I_E S_E$ in the dynamic equation. The motor/generator can then be used to allow the engine to operate at "wide open throttle" (WOT), or along the "Ideal Torque/Speed Operating Line" (IOL) for best efficiency and lowest emissions, or along any other predetermined operation line. In this way, the engine can be run continuously while energy flows into or out of the battery energy storage system connected to the electric motor/generator. If the battery is large enough to drive the vehicle a long distance, then the efficiency of energy into and out of the battery is high since the battery internal resistance is low. This concept is especially desirable for a charge depletion hybrid electric vehicle as described in my prior patent, U.S. Pat. No. 5,842,534 which is incorporated herein by reference, where the large battery pack is charged from stationary powerplants. The emissions of the gasoline or diesel engine can be controlled effectively because the engine is operated at high load consistently. The present invention ensures that the gasoline or diesel engine is never operated at closed throttle at high speeds or operated at low efficiency low load conditions. If the power required is lower than the minimum power of the engine on the IOL, the engine is automatically decoupled and stopped (or idled if desired), and the vehicle is operated as an electric vehicle.

An object of the invention is to provide for simultaneous control of the acceleration, deceleration or braking of a vehicle and the torque and speed of the engine in a vehicle.

Another object of the invention is to control the torque of the electric motor/generator to provide acceleration, deceleration and braking of a vehicle having an engine, transmission and electric motor/generator.

Another object of the invention is to allow the engine in a vehicle to always operate at wide open throttle (WOT) or along the ideal torque/speed operating line (IOL) and to vary power by engine speed.

Another object of the invention is to provide for reduced emissions of an engine by restricting its operating range.

Another object of the invention is to provide for consistently high load operation of an engine.

Another object of the invention is to achieve high vehicle acceleration and deceleration performance from a hybrid electric vehicle using a combustion engine and electric motor.

Another object of the invention is to reduce battery cycling and improve battery life in a hybrid electric vehicle.

Another object of the invention is to allow a vehicle to sustain a charge on the batteries dependent on the driving load.

Another object of the invention is to improve the efficiency of a hybrid electric vehicle.

Another object of the invention is to maximize operating efficiency of the combustion engine in a hybrid electric vehicle at varying power levels, thereby providing for betters economy.

Another object of the invention is to maximize the range of a charge depletion hybrid electric vehicle as described in my prior patent, U.S. Pat. No. 5,842,534 which is incorporated herein by reference.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings, where like reference numbers denote like parts, which are for illustrative purposes only.

DETAILED DESCRIPTION OF THE INVENTION

Referring more specifically to the drawings, for illustrative purposes the present invention is embodied in the apparatus and method generally shown in FIG. 4 through FIG. 13. It will be appreciated that the apparatus and associated control method may vary as to their details without departing from the basic concepts as disclosed herein.

Figure 4:
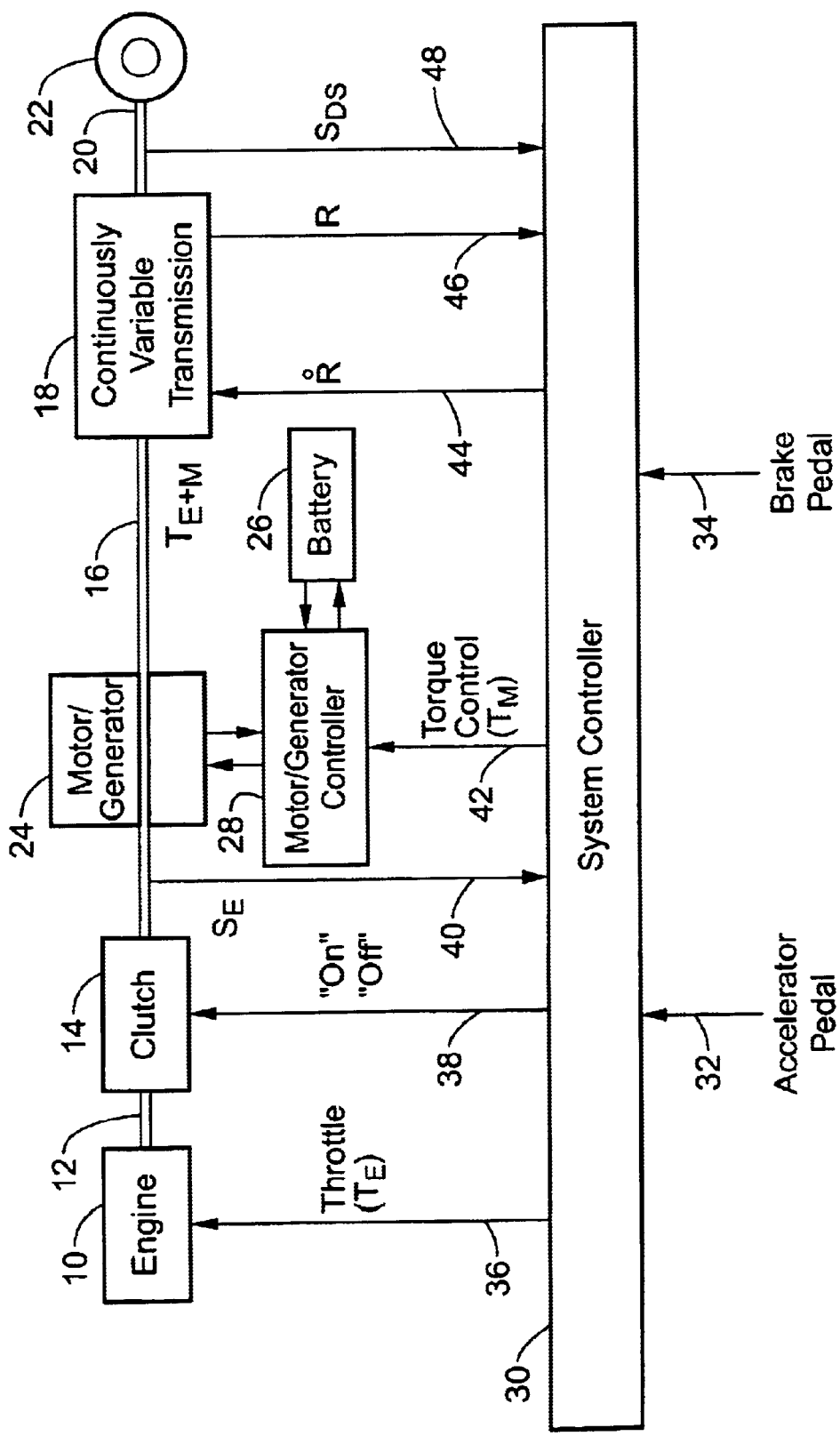
FIG. 4 is a functional block diagram of a control apparatus in accordance with the present invention in a parallel hybrid configuration having a continuously variable transmission in the drive train

Referring first to FIG. 4, in accordance with the present invention an electric motor 24 is coupled to the input shaft 16 of the continuously variable transmission 18 so that it injects power in parallel with the drive train between engine 10 and continuously variable transmission 18. Electric motor 24 is powered by a battery 26, which would typically comprise a bank of batteries, ultra-capacitors or the like, such as those used in electric vehicles. Operation of electric motor 24 is controlled by a motor controller 28, which is a conventional electronic armature controller or the like, which is in turn controlled by a microprocessor-or other computer-based programmable system controller 30.

The size of electric motor 24 can vary and, while electric motor 24 can be a motor only, electric motor 24 is preferably a motor/generator that can also be used to charge battery 26. Therefore, all references to the terms "motor" or "motor controller" in the specification and claims are intended to encompass either a motor and a motor controller or a motor/generator and motor/generator controller, respectively. References herein made to "motor/generator" and "motor/generator controller" are for purposes of describing the preferred embodiment of the invention. Electric motor 24 would, for example, be a conventional DC or AC or switch reluctance or other torque controlled high power traction motor/generator used in hybrid and electric vehicles.

It will be appreciated that an automatic transmission can be used in place of the CVT. Therefore, all references to "transmission" in the specification and claims are intended to encompass either a continuously variable transmission or an automatic transmission. References made herein to "continuously variable transmission" are for purposes of describing the preferred embodiment of the invention. It will also be appreciated that a mechanical CVT or automatic transmission 18 can be eliminated altogether and replaced by the motor (or motor/generator) and motor controller (or motor/generator controller) in combination with a generator (or generator/motor) and generator controller (or generator/motor controller) as will be discussed below with reference to FIG. 5 and FIG. 6.

In the embodiment shown in FIG. 4, system controller 30 processes a plurality of control and feedback signals. As shown, the primary input control signals are from the vehicle accelerator pedal 32 and brake pedal 34. It will be appreciated that other control signals may also be used for example, such as park, drive, performance and so forth. Based on these signals, system controller 30 sends a throttle control signal 36 to engine 10 to control the engine torque $T_E$, an engine engagement on/off signal 38 to clutch 14, a torque control signal 42 to motor controller 28 to control motor torque $T_M$, and a rate of change of speed ratio control signal 44 to control the rate of change $\dot{R}$ of the speed ratio R of continuously variable transmission 18, where $$R = \frac{S_E}{S_{DS}},$$

$S_E$=engine speed and $S_{DS}$ =driveshaft speed. It should be noted that $$S_{DS}=S_{CAR} \times C$$

where $S_{CAR}$ is the speed of the vehicle and C is a constant dependent on the gear ratio of the final drive and tire radius for the vehicle. At the same time, system controller 30 senses engine speed $S_E$ via speed signals 40, the ratio R via signals 46, and vehicle speed $S_{CAR}$ via signals 48. Note that the system controller 30 may send an "on/off" signal to engine 10, but a separate starter motor is not needed; electric motor 24 can be used start engine 10 because it is coupled to engine output shaft 12 through clutch 14. The engine 10 may be turned "off" or idled when clutch 14 is opened.

Figure 5:
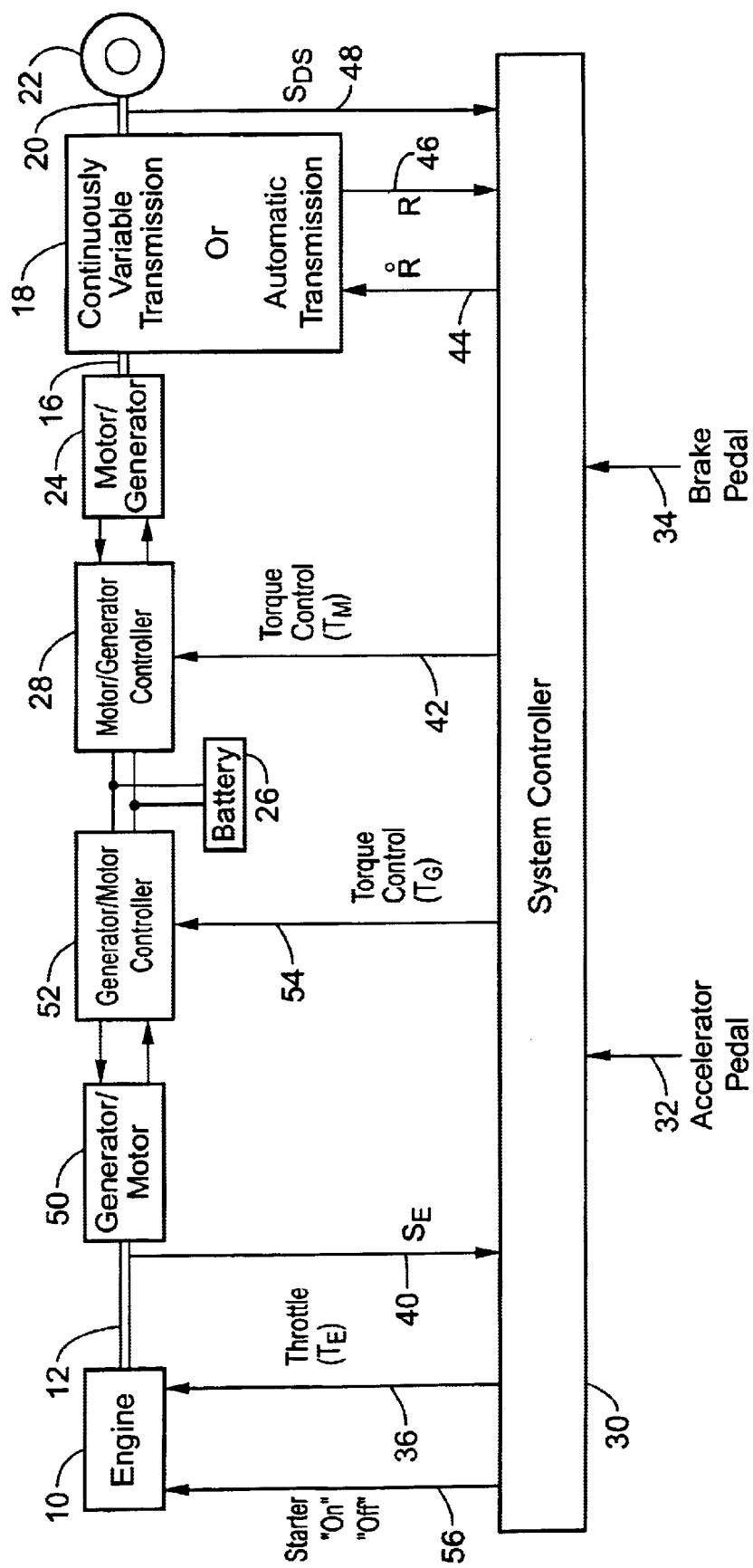
FIG. 5 is a functional block diagram of an alternative embodiment of the control apparatus shown in FIG. 4 in a series hybrid configuration having a continuously variable or automatic transmission in the drive train.
Figure 6:
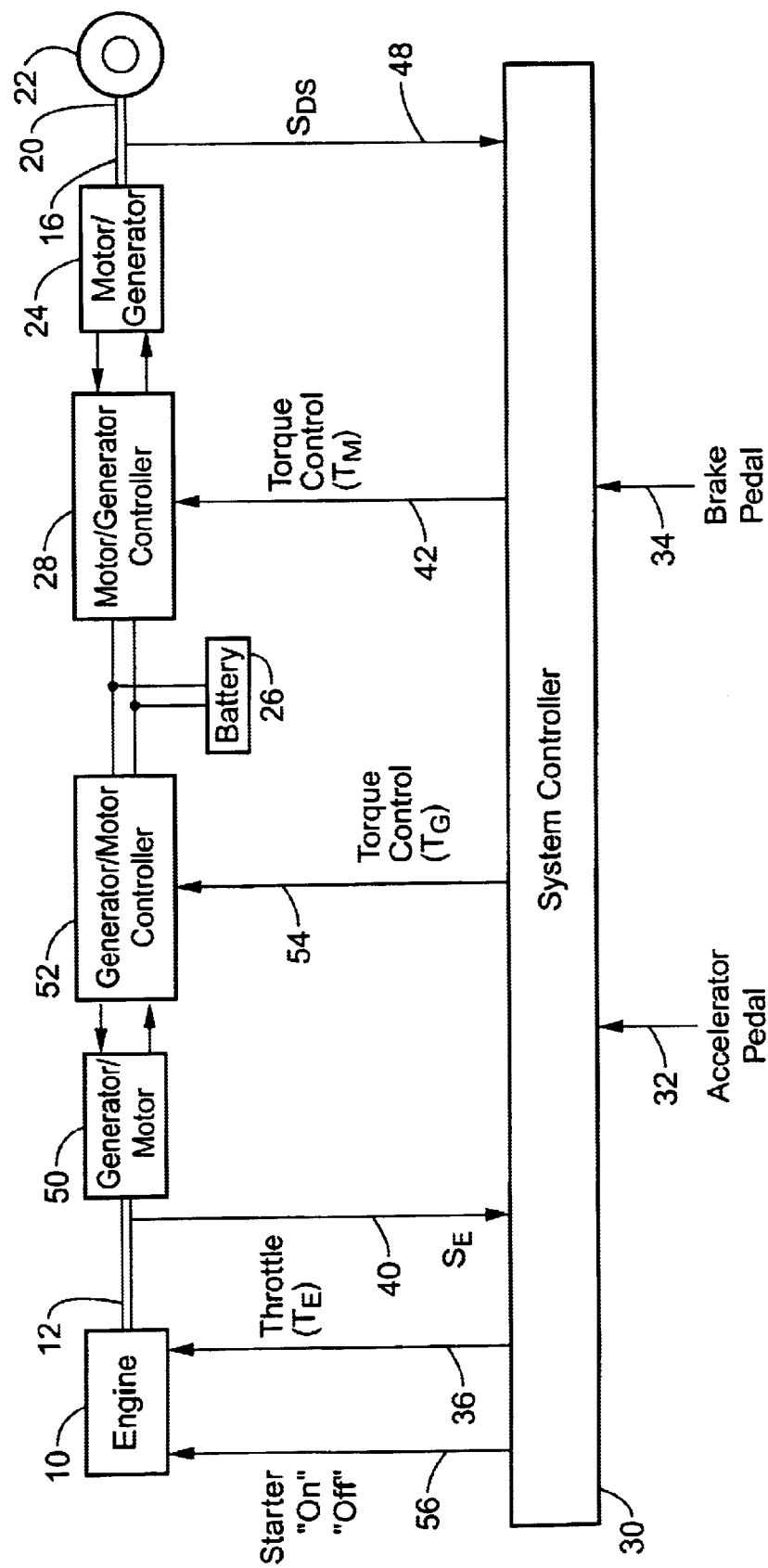
FIG. 6 is a functional block diagram of the control apparatus shown in FIG. 4 where the generator/motor and controller, and the motor/generator and controller are used as an electric continuously variable transmission.

Referring now to FIG. 5 and FIG. 6, the present invention can be extended to a series hybrid vehicle configuration as shown in which a generator 50 is used to provide charging capability for battery 26 as well as to provide a braking effect for engine 10 during deceleration. Operation of generator 50 is preferably controlled by a generator controller 52, which is a conventional electronic armature controller or the like. Generator controller 52 controls generator torque, $T_G$, in response to signals received from system controller 30 through torque control line 54. Note that $T_G=T_E$ in this configuration.

Preferably, generator 50 is of a generator/motor type so that operation can force engine 10 to achieve the desired speed quickly, thus providing for fast overall engine response. Therefore, all references to the terms "generator" or "generator controller" in the specification and claims are intended to encompass either a generator and a generator controller or a generator/motor and generator/motor controller, respectively. References herein made to "generator/motor" and "generator/motor controller" are for purposes of describing the preferred embodiment of the invention. Generator 50 would, for example, be a conventional DC or AC or switch reluctance or other torque controlled high power traction generator/motor used in hybrid and electric vehicles.

Note also the inclusion of an optional starter control line 56 for starting and shutting down engine 10. Where a generator 50 is of a generator/motor type, it may be possible to eliminate the need for a starter motor if the motor portion of generator 50 has a sufficiently high output.

In these embodiments of FIG. 5 and FIG. 6, engine 10 can be operated at high torque but at a power necessary to provide steady cruise speed. The engine torque and power may be small compared with the electric motor/battery power. A mechanical CVT or automatic transmission 18 may be used as shown in FIG. 5, or eliminated altogether as shown in FIG. 6 since generator 50 and motor (or motor/generator) 24 via the generator controller 52 and motor controller 28, respectively, together function as an electric CVT. In the embodiments of FIG. 5 and FIG. 6, generator 50 is used to control the engine power by temporarily putting energy into, or taking energy out of, battery 26 based on the power commanded by the driver.

Note that operation of the engine in the above configuration is considerably different than in a conventional series hybrid vehicle where the engine is always running at one speed. When the engine is operated at a constant speed, the efficient power output only occurs at one level. Thus the batteries will have to absorb excess power or provide additional power to drive the vehicle. This results in considerable deep battery cycling and attendant inefficiencies. In the present invention, however, the engine is used more and the batteries are shallow cycled. Because the amount of power cycled by the batteries is greatly reduced with the present invention, the range per battery charge is increased. Battery life is increased as well.

Figure 7:
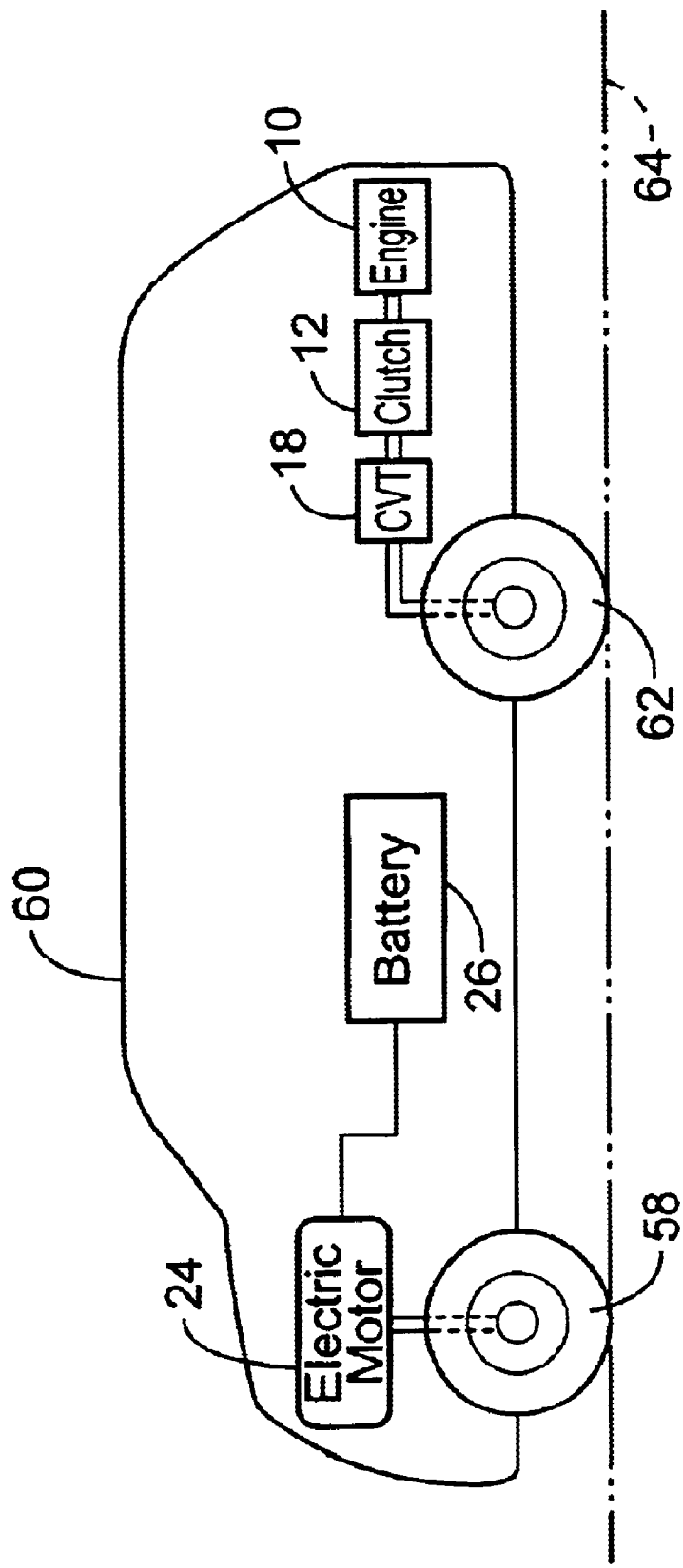
FIG. 7 is a functional block diagram of an alternative embodiment of the invention functioning as a dual power parallel hybrid system.

Referring now to FIG. 7, the invention can also be applied to dual power parallel power train as shown. This embodiment provides torque from, both the front wheels 58 of the vehicle 60 electrically from the electric motor (or motor/generator) 24 and the rear wheels 62 mechanically from engine 10 through clutch 14 and CVT 18. Note that the block shown as CVT 18 could be a conventional continuously variable or automatic transmission. Note also that the CVT 18 is connected only to engine 10; the road and tires effectively connect the front and rear wheels together through the road 64, with the road 64 effectively acting as a shaft. It will be appreciated that the drive wheels may also be reversed, with the electric motor at the rear and the engine and CVT at the front of the vehicle. In this case, the electric motor controls the engine through the CVT, the output of which is controlled through the road. Thus, this configuration is effectively that of a parallel hybrid configuration and would be controlled using a hybrid of the embodiments shown in FIG. 4 and FIG. 5. The electric motor 24 can once again control the overall force of the vehicle so that the concept of engine and vehicle control shown in FIG. 4 is accomplished. The engine can then operate on the IOL with modulating torque from the electric motor 24. The advantage of this system is a small engine-CVT system relative to the high power electric motor that can be used for high fuel efficiency and performance.

Figure 8:
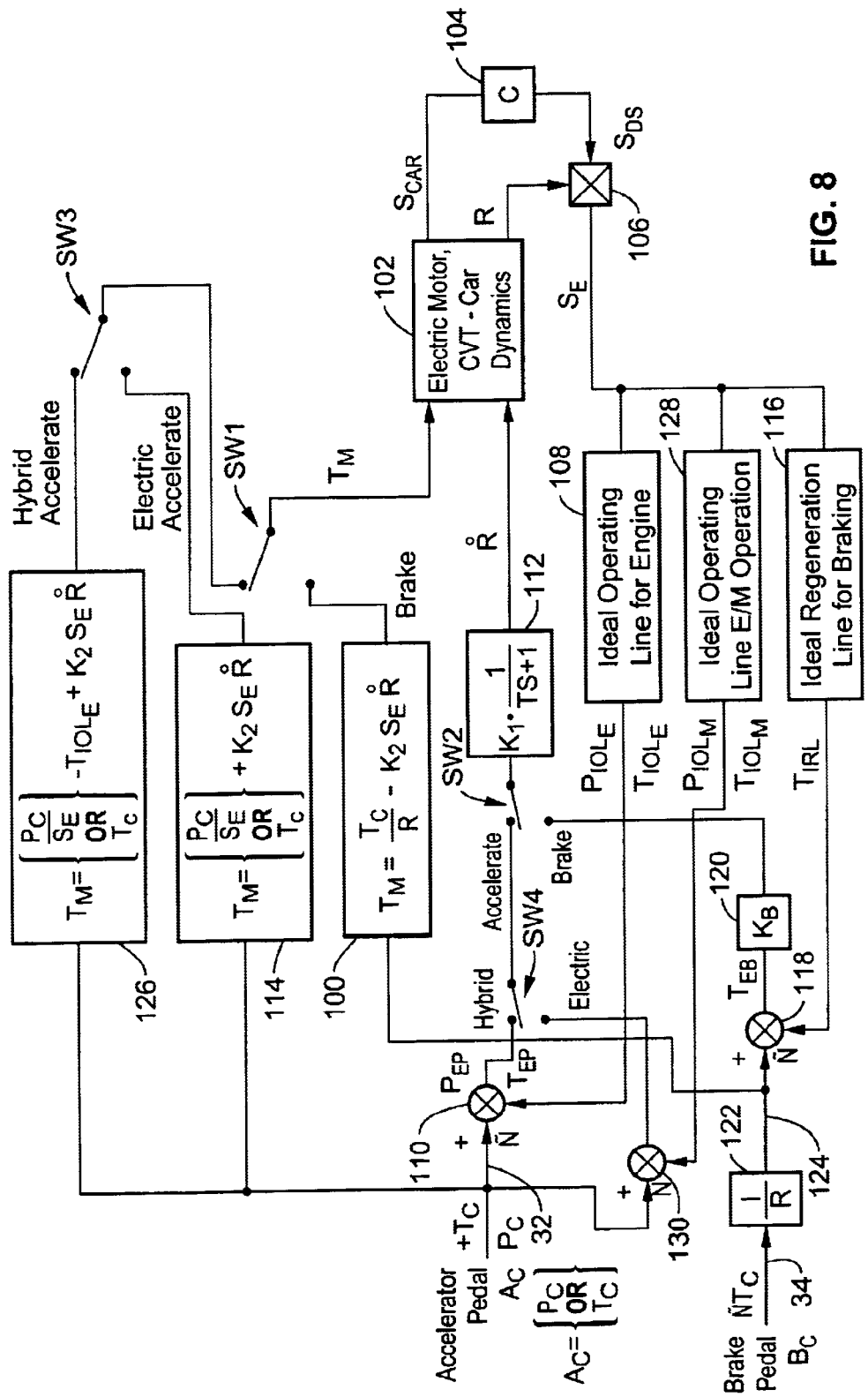
FIG. 8 is a flow diagram showing the control method of the present invention.
Figure 9:
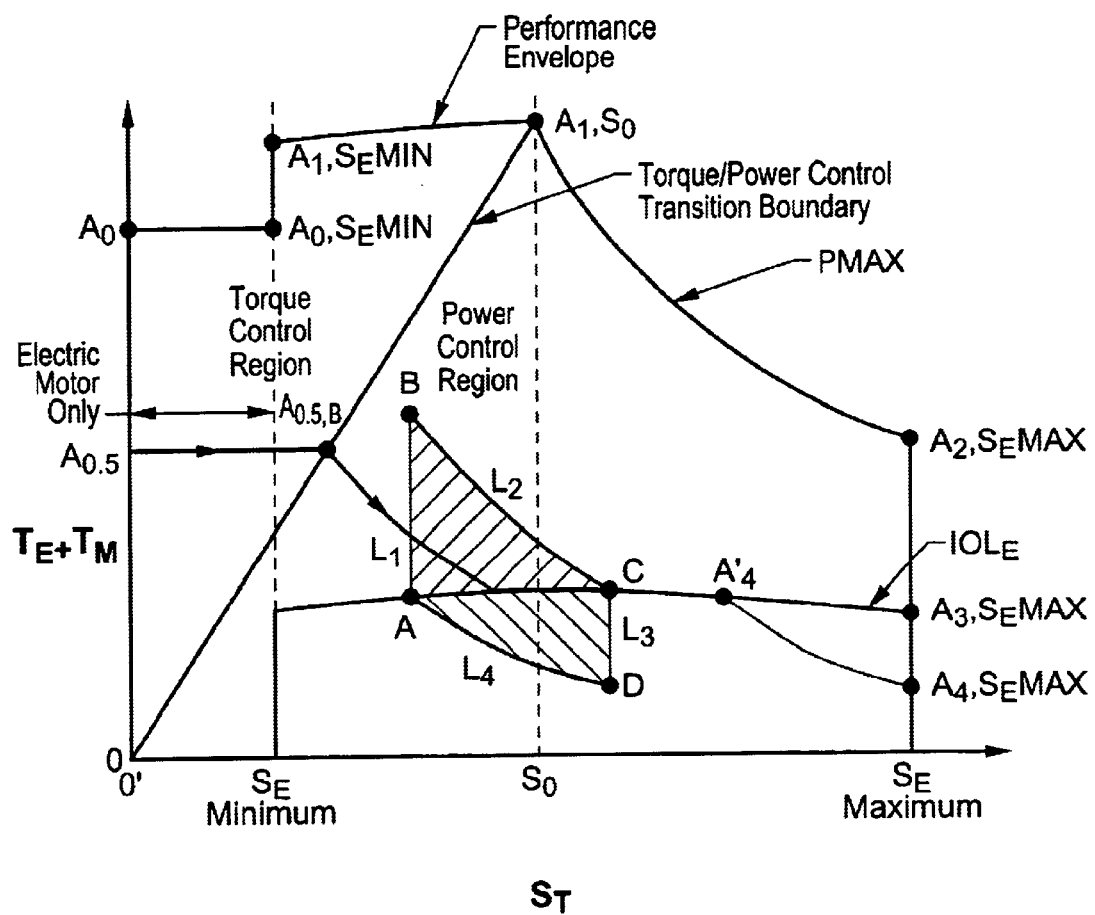
FIG. 9 is a graph showing engine and electric motor/generator torque as a function of engine and transmission speed, as well as the operational boundary for acceleration and a typical acceleration/deceleration cycle for the apparatus shown in FIG. 4.

Referring now to FIG. 4, FIG. 8 and FIG. 9 together, system controller 30 implements the control and sensing functions of the invention using conventional hardware and/or software. In FIG. 8, $A_c$=accelerator pedal position and represents power or torque commanded by the driver ($P_C$ or $+T_C$, respectively); $B_{C}$=brake pedal position representing negative torque commanded by the driver ($-T_C$); $T_M$ electric motor torque; $P_{EP}$ the error or difference between the power commanded by the driver and the power along the IOL for the power control mode ($P_C-P_{IOL}$); $T_{EP}$=the error or difference between the torque commanded by the driver and the torque along the IOL for the torque control mode $$\left(T_C - \frac{P_{IOL}}{S_E}\right);$$

$P_{IOLE}$=the power along the ideal operating line of the engine; $P_{IOLM}$=the power along the ideal operating line of the electric motor; IRL=the ideal regeneration line for braking; $T_{EB}$=the error or difference between the braking commanded by the driver and the braking along the IRL for the braking control mode ($B_{C-TIRL}$); $T_{IRL}$=the torque along the ideal regeneration line for braking; $K_1$=a gain adjustment for desired response time and stability of the circuit, $K_2$=a gain adjustment set in response to $S_E\dot{R}$ in order to achieve the desired response characteristics in FIG. 9, T=the time constant of the filter, S=the Laplace transform of variable $P_{EP}$ or $T_E$ which is easily programmed by those skilled in the art; R=the ratio between engine speed and driveshaft speed; $\dot{R}$=the rate of change of ratio R; C=a conversion constant to convert vehicle speed to driveshaft speed; $S_E$=engine speed; $S_{DS}$=drive shaft speed; $S_{CAR}$=vehicle speed; and $K_B$ is a gain value for scaling. When the accelerator pedal is depressed, switches SW1 and SW2 go to the accelerator position. Switches SW3 and SW4 will be set according to whether the vehicle is in the electric or hybrid mode. Similarly, when the brake pedal is depressed, switches SW1 and SW2 go to the brake position. Each of these switches generally may be software switches in system controller 30. The $IOL_E$ of the engine is obtained by testing the engine to determine the best efficiency and emissions at each speed. The $IOL_M$ and IRL are obtained by testing the electric motor/generator and battery system to obtain the most energy into the battery at each speed. Note that the $IOL_M$ is used when the vehicle is in the electric drive mode where the vehicle is operated, generally, below freeway speeds until the batteries are depleted to a predetermined state as described in U. S. Pat. No. 5,842,534.

There are many possible control algorithms for hybrid electric vehicles. The control objective here is to drive the vehicle using electric energy until the internal combustion engine is turned "on" and then drive the vehicle with the internal combustion engine as much as possible, automatically supplementing the internal combustion engine with electric energy when needed to maintain operation of the engine along the IOL. Significantly, energy may be put back into the batteries temporarily when the engine power is reduced in order to keep the engine on the IOL at all times in the hybrid mode. This kind of operation can significantly reduce emissions and increase engine efficiency.

It will be appreciated that there are many ways to determine when the engine would be "on". For purposes of the present invention, the control strategy of FIG. 8 will function with charge depletion HEV implementations as shown in my prior U.S. Pat. No. 5,842,534 as well as most conventional charge sustaining HEV implementations. For any given engine speed, there is only one power that falls on the IOL. The IOL is engine dependent, and is determined empirically from test data. In the preferred embodiment, the IOL is the line representing engine power output per speed that provides the best engine efficiency and low emissions. It will be appreciated, however, that the IOL could represent any desired engine operating condition at a particular engine speed. Since the power output varies as a function of speed and load on the engine, the present invention uses motor 24 as in FIG. 4, or generator 50 and/or motor 24 in FIG. 5 and FIG. 6, to vary the speed and power output of the engine to be on the IOL at all times when the engine is "on".

In operation, system controller 30 senses the acceleration command $A_C$ from the accelerator pedal and the switches SW1 and SW2 shown in FIG. 8 go to the accelerator position. When power or a positive torque is commanded by the driver ($P_C$ or $+T_c$) in the electric vehicle mode determined by SW3 and SW4 as the case may be depending upon whether or not the system is operating in the power control region or the torque control region shown in FIG. 9, the system is in an acceleration mode and the desired motor torque $T_M$ is then determined at 114 according to $$T_M = \frac{P_C}{S_E} + K_2 S_E \mathring{R} \quad \text{or} \quad T_M = T_C + K_2 S_E \mathring{R}$$

if the vehicle is in the hybrid-mode, then $T_M$ is determined at 126 according to $$T_M = \frac{P_C}{S_E} - T_{IOL_E} + K_2 S_E \mathring{R} \quad \text{or} \quad T_M = T_C - T_{IOL_E} + K_2 S_E \mathring{R}$$

The motor torque signal determined above is sent to motor controller 28 in FIG. 4 to vary the speed and power of engine 10 and to drive the car. The resultant change in electric motor torque in turn affects the vehicle dynamics at 102, which affect engine speed, vehicle speed and the ratio R at CVT 18. Taking the speed of the vehicle $S_{CAR}$ as well as the ratio R at 102, in FIG. 8, engine speed $S_E$ (which may also be the same as the motor speed $S_M$ where they are on a common shaft) can be determined by applying a conversion constant C to the vehicle speed $S_{CAR}$ at 104 to get the speed $S_{DS}$ of driveshaft 20 of FIG. 4 (which is the output of CVT 18) and then multiplying the driveshaft speed $S_{DS}$ by the ratio R at 106 in FIG. 8 to give the engine speed $S_E$. Now having engine speed $S_E$, at 108, 116 and 128 look-up tables containing the IOL entries for the hybrid mode, braking mode and the electric mode, respectively, are accessed to determine the ideal engine power or torque output level for the given speed. Then, at 110 for the hybrid mode, 118 for the braking mode or 130 for the electric mode, the output of the corresponding look-up table is compared with either the power $P_C$ (if in power control mode) or positive torque $+T_C$ (if in torque control mode) commanded by the driver with the accelerator pedal as sensed from accelerator pedal position $A_C$ to determine a power error $P_{EP}$ or a torque error $T_{EP}$. One manner in which $P_{EP}$ or $T_{EP}$ could be determined, for example, would be to use a potentiometer that produces an output signal in response to accelerator pedal position ($P_C$ or $T_C$), and subtracting the appropriately scaled $P_{IOL}$ or $T_{IOL}$ from the look-up tables. Transducers, digital to analog converters and/or analog to digital converters, could also be used as is conventional in the signal acquisition and processing art. The corresponding error signal is then used to affect the rate of change $\mathring{R}$ of the ratio R after filtering the signal at 112. CVT 18 of FIG. 4 thus responds in i accordance with the adjustment of $\mathring{R}$.

An important aspect of the control system is the control of the rate of change of ratio R or $\mathring{R}$. This is accomplished by filtering the error signal between the commanded power PC or torque TC and the IOL power or torque. The signal filtering, which is in the form of $$K_1 \cdot \frac{1}{TS+1}$$

is well known in the art of electrical engineering. It is understood that this filter is only representative of one form that may be placed at this point, and in practice the filter may include both linear and non-linear elements. The purpose of the filter is to allow the designer to control the ratio rate, $\mathring{R}$. It is undesirable to change R quickly and, therefore, a filter is necessary to provide the desired system response. The values of $K_1$ and T are heuristically determined, as is the form of the filter (which is shown here as first order). Those skilled in the art will appreciate that filters of many other representations will work and can be selected depending on the desired response, and the scope of the present invention should not be limited by the use of this particular filter.

During braking, torque is being commanded at the wheels rather than engine power. Here, system controller 30 senses the braking command $B_C$ from the brake pedal. When the driver commands negative torque $-T_C$, the system is in a deceleration (regeneration) mode and the switches go to the brake position. Here, control of the CVT and electric motor/generator reverses to produce a negative torque on the driveshaft, thus braking the vehicle. It will also be appreciated that a mechanical backup brake (not shown) for use in emergencies, panic stops and parking. The operation of the braking circuit is similar to that of the accelerator circuit except for the use of the ideal regeneration line IRL, which reflects the highest efficiency for a given power for regenerating energy into the batteries by the electric motor/generator.

For purposes of braking, the desired motor torque $T_M$ is determined at 100 according to $$T_M = \frac{T_C}{R} - K_2 S_E \overset{\circ}{R}$$

and the signal is sent to motor/generator controller 28 to vary the speed and power of engine 10. The resultant change in electric motor/generator and engine torque again affect the vehicle dynamics at 102, to slow the car which affects motor and/or engine speed, vehicle deceleration and the ratio R at CVT 18. Here, however, engine speed $S_E$ is used at 116 to access a look-up table containing entries representing the IRL, which is also an empirically determined table. Then, at 118, the output of the look-up table is compared with the negative torque $-T_C$ commanded by the driver with the brake pedal as sensed from brake pedal position $B_C$ to determine the braking torque error $T_{EB}$. The braking torque error signal $T_{EB}$ is then scaled by a value of $K_B$ through gain box 120 and used to affect the rate of change $\overset{\circ}{R}$ of the ratio R after filtering at 112. It should be appreciated that the filtering in the brake torque control can be different if desired and that gain box 120 may contain additional filters.

Therefore, FIG. 8 and FIG. 9 represent the controls for the configuration shown in FIG. 4 and, in principle, the controls for the configurations expressed in FIG. 5 through FIG. 7 or other hybrid electric drive systems. Note that the configuration shown in FIG. 6 can be used directly with the control scheme shown in FIG. 8 and FIG. 9 discussed below since the mechanical CVT shown in FIG. 4 is simply replaced by its electrical equivalent. However, those skilled in the art will appreciate that slight modification of the control scheme shown in FIG. 8 and FIG. 9, consistent with the discussion herein, would be necessary for use with the configuration shown in FIG. 5, since both a mechanical CVT and its electrical equivalent are used. In FIG. 5, the generator/motor is used to control the engine along the IOL instead of the CVT. Energy will flow into and out of the battery a little more and most of the generator electric energy will go directly to driving the motor/generator The CVT or discrete automobile transmission will need an additional controller, which can be configured again similar to that shown in FIG. 8. Those skilled in the art will also appreciate that slight modification of the equations of control scheme shown in FIG. 8, consistent with the discussion herein, would be necessary for use with the configuration shown in FIG. 7 since the electric motor 24 is connected to the output of CVT 18 rather than the input. The operational characteristics shown in FIG. 9 would, however, remain the same. The connection between the electric motor and the engine is made up through the road 64 between the front and rear wheels. Additionally, those skilled in the art will appreciate that there are other protection and limiting control loops that can be employed to make the CVT controller practical for all driving conditions, and that the flow diagram of FIG. 8 represents a preferred embodiment depicting the basic concept of the invention.

Figure 10:
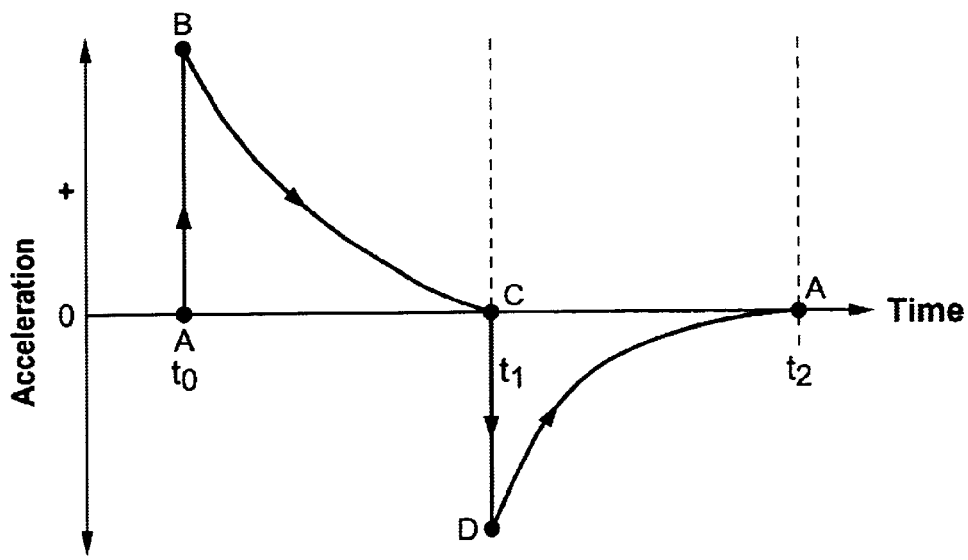
FIG. 10 is a graph showing the acceleration/deceleration cycle shown in FIG. 9 as a function of time.

Referring to FIG. 9 and FIG. 10, it can be seen that if the vehicle is at a steady state at A and then an acceleration command ($+\Delta A_C$) is suddenly applied by the drive, then this produces torque instantly to move from steady state cruise at point A to power at point B along line $L_1$. Then the power at point B is held constant as the vehicle accelerates and the CVT transmission input speed and torque moves along line $L_2$ to a new steady state cruise point at point C. If the driver lets up on the accelerator pedal ($-\Delta A_C$) so that it returns to its original position, at point C, the acceleration of the vehicle suddenly changes, the power goes to point D along line $L_3$ and the vehicle then decelerates along a lower power line $L_4$ back to the steady state cruise speed at point A. Note that the electric motor torque $T_M$ overrides the engine torque $T_E$ with a negative torque to force the engine to slow down to the desired power level at point A. To override the engine torque along the IOL, several methods can be used. One method would be to the electric motor to directly oppose the engine by reversing polarity and drawing energy from the batteries. A second and preferred method would be to use the motor/generator in a generator mode, thereby absorbing the necessary torque and returning energy to the batteries. This constitutes an acceleration/deceleration cycle by the accelerator pedal.

Referring more particularly to FIG. 9, when the accelerator pedal is depressed to a position between 0 and $A_0$, for example to $A_{0.5}$, when the speed of the car is zero the control system is operating in the torque control region shown. The control system of FIG. 8 will cause the car to accelerate at a rate proportional to this accelerator pedal position. This acceleration will remain constant and power will increase linearly until the CVT (or transmission) input speed $S_T$ reaches the torque/power control transitory boundary line from 0,0 to $A_1$, $S_0$ at $A_{0.5}$, B. If the accelerator pedal position remains unchanged, then as the vehicle continues to accelerate, and the CVT input speed $S_T$ increases beyond the boundary, the power of this system will remain constant and torque will decrease linearly as speed increases. This means that the torque will decrease inversely proportional to the speed increase of $S_T$. This decrease in torque will continue until the speed of the vehicle increases to a point where the torque required to overcome rolling friction, aerodynamic drag, and internal friction losses is equal to the commanded power. The vehicle at this point will then stop accelerating and continue at a constant speed.

Note that the arbitrary boundary in FIG. 9 which divides the operating range into a torque control region and a power control region is preferable because of the nature of the CVT and the characteristics of the motor and engine. This boundary is shown as a line between the torque speed origin and the point $A_1$, $S_0$. Another boundary which separates electric operation from hybrid operation is shown in FIG. 9 as the vertical line at point $S_E$ minimum. This boundary, however, is arbitrary and can consist of a curve or a series of steps or a vertical line from $A_1$, $S_0$ to the speed axis at $S_0$. The transition from torque control to power control should be seamless to the driver of the vehicle as well as when the engine is coupled on or off. The high power electric motor is used to provide this seamless transition.

If the accelerator pedal is depressed to maximum at zero (0) speed, the torque of the motor will go to a maximum at $A_0$. Then, as the car accelerates, the motor torque will remains at maximum until $S_E$ MIN. At this point, if the engine control system is enabled, the engine will come "on" by closing clutch 14 (FIG. 4). The torque will then jump to $A_1$, $S_E$ MIN and the torque of the motor and engine will remain along the maximum line until the CVT input speed $S_T$ (which is now both the speed of the engine $S_E$ and the speed of the motor $S_M$, that is $S_T=S_E=S_M$) reaches $S_0$ as the vehicle accelerates. The operating point is now $A_1,S_0$ which is a torque level of $T_E+T_M$ MAX=$A_1$ and a speed of $S_0$. This point is the maximum allowed power to the electric motor. As the speed further increases, the maximum power of the motor is added to the increasing power of the engine. These powers are additive, but the torque decreases to the point $A_2,S_E$ MAX as the vehicle continues to accelerate. The electric motor maximum speed $S_M$ MAX and the gasoline engine maximum speed $S_E$ MAX are preferably the same. Thus, $S_E$ MAX=$S_M$ MAX=$S_T$ MAX. Otherwise $S_T$MAX= min of ($S_E$ MAX or $S_M$ MAX). This point $A_2,S_E$ MAX will be maintained as the vehicle continues to accelerate and the CVT ratio R changes. The vehicle speed continues to increase until the load and friction drag become equal to the torque at $A_2,S_E$ MAX or Scar MAX is reached. The vehicle will then stop accelerating. Note that this will be the vehicle's top speed.

At this point if the accelerator pedal is decreased to $A_3$, then the torque will decrease to a level supplied by the engine alone operating on the IOL. The electric motor torque goes to zero.

If the accelerator pedal decreases further to the point $A_4,S_E$ MAX which represents a lower power than the IOL of the IC engine, the speed of the engine $S_E$ and electric motor $S_M$ and the transmission input $S_T$ will decrease along a constant power line to point A 4' where again the gasoline engine is supplying all the power to drive the vehicle. In order to proceed from point $A_3$ to point $A_4$, the electric motor/generator torque $T_M$ will become negative since the term $$\frac{P_C}{S_E}$$

in block 126 of FIG. 8 will be negative at this instant.

We can now explain a typical operation shown in FIG. 9 in conjunction with the control diagram of FIG. 8. The vehicle is now cruising at a fixed speed when the engine is supplying all the power to drive the vehicle and the electric motor/generator is supplying no power. Consider point A in FIG. 9 in this condition of steady state operation where $P_{EP}=0$ and $P_C=P_{IOL}$ is reached with the accelerator pedal position at $A_{CA}$. If the driver suddenly depresses the pedal to a second position, which will be designated as $A_{CB}$, meaning the driver wants to increase power, the torque increases instantly to point B along line $L_1$ with torque supplied by the electric motor and battery. This is so because $P_{EP}$ is now greater than $P_{IOL}$. Then $T_M$ is computed in block 114 if the vehicle is in the electric mode or block 126 if vehicle is in the hybrid mode. It will be appreciated that at this instant that $\dot{R}=0$. Then $P_C/S_E$ supplies all necessary torque in electric mode and $P_C/S_E-T_{IOLE}$ or $T_{C-TIOLE}$ supplies all of the torque if in the hybrid mode. This motor torque signal is transmitted to block 102. The power desired by the driver is then achieved instantly. If the accelerator pedal is held constant at this point over time, then the torque of the electric motor will decrease along a line of constant power along line $L_2$ in FIG. 9, thus holding the power constant as the vehicle accelerates. This line $L_2$ represents the action of the feedback loop as designed in FIG. 8 which includes blocks 102, 104, 106, 108 and 110 (or 128 and 130), and 114 or 126. The vehicle will continue to accelerate with motor torque decreasing along line $L_2$ until the point C is reached along the constant power line $L_2$. This point is reached when $P_{EP}$ is iteratively reduced to zero and $P_C=P_{IOL}$. It will be appreciated that at all times during this process, the engine always operates along the IOL.

The car then will maintain this speed until the position of accelerator pedal is again changed. If the accelerator pedal is now reduced to the original position, the net torque will be reduced to point D, and speed will proceed back to point A along a constant power line $L_4$. To accomplish this, the electric motor/generator must supply a negative torque to reach point D along line $L_3$. This happens instantly. As the net torque and power proceeds along line $L_4$, the electric motor/generator torque gradually approaches zero as the vehicle again begins to cruise when the accelerator position returns to $A_{CA}$. Note that in this preferred mode the deceleration maneuver returns energy to the battery system described above, and the acceleration maneuver takes energy from the battery system while the engine continues to operate along the IOL.

It will be appreciated, therefore, that the throttle opening of the engine is set to provide the best efficiency for a given power along the IOL. The electric motor is used to force the engine to operate along the IOL and to provide correct transient response to the vehicle. Note that a large electric motor and a small engine is preferred, but the invention can also employ a large engine and small electric motor with slower response. The CVT provides the correct speed and power setting as quickly as dynamics and motor capacity allow. The battery capacity is then used to temporarily provide and absorb energy to allow the CVT to change ratio without detrimental effects on performance. It will further be appreciated that this is accomplished, in the preferred embodiment, by having the engine and the electric motor on the same shaft in the preferred embodiment.

Figure 1:
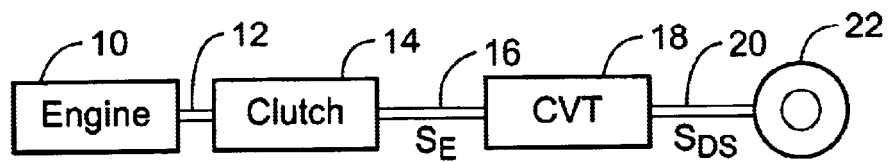
FIG. 1 is a functional block diagram of a prior art vehicle with a power train employing a continuously variable or multi-speed automatic transmission.
Figure 2:
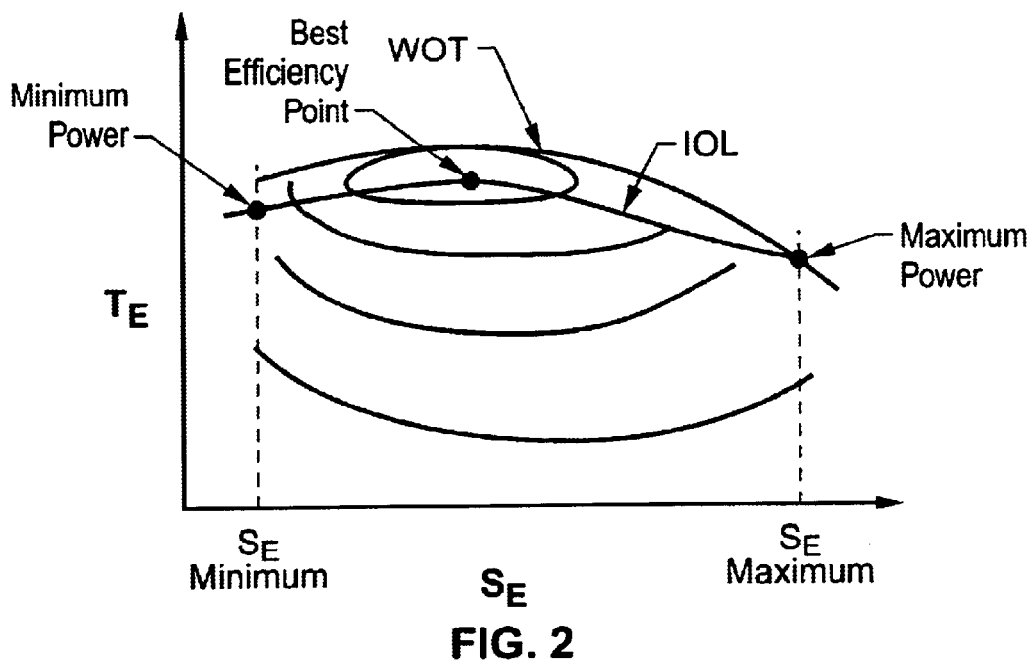
FIG. 2 is a graph showing the torque-speed efficiency map of a typical combustion engine showing maximum torque at wide open throttle (WOT) and an ideal operating line (IOL) which produces the best efficiency and minimum emissions for a given power of the engine shown in FIG. 1.
Figure 3:
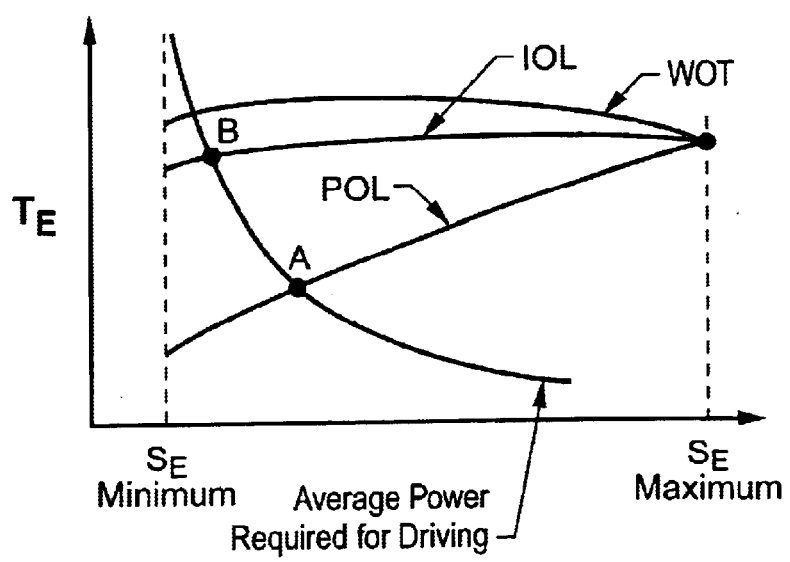
FIG. 3 is a graph showing the practical operating line (POL) required for the conventional vehicle shown in FIG. 1 compared with the ideal operating line (IOL).

Based on the foregoing, it will be appreciated that the present invention can take advantage of the electric motor in a common shaft hybrid electric power train in a way heretofore unknown. The electric motor can be used to supplement and control the gasoline or diesel engine during both acceleration and deceleration of the vehicle, thus allowing the engine to run at optimum efficiency across its entire speed band with generally a fixed throttle setting or in an un-throttled state so as to maximize engine efficiency. This is not possible in a conventional continuously variable transmission system as discussed in FIG. 1.

Figure 11:
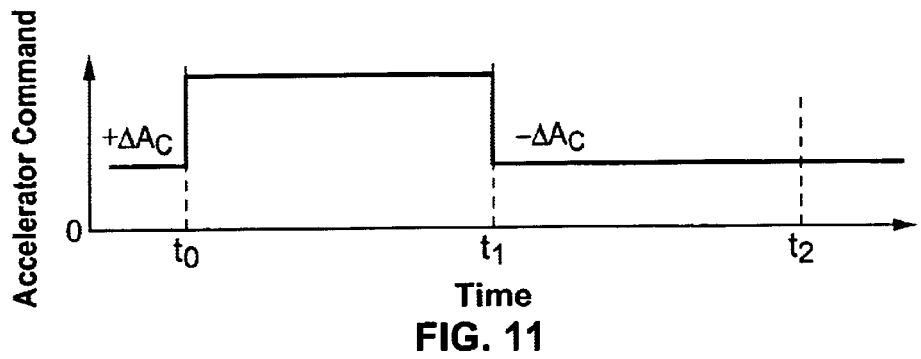
FIG. 11 is a graph showing accelerator pedal change necessary to accomplish the acceleration/deceleration cycle shown in FIG. 9 as a function of time.
Figure 12:
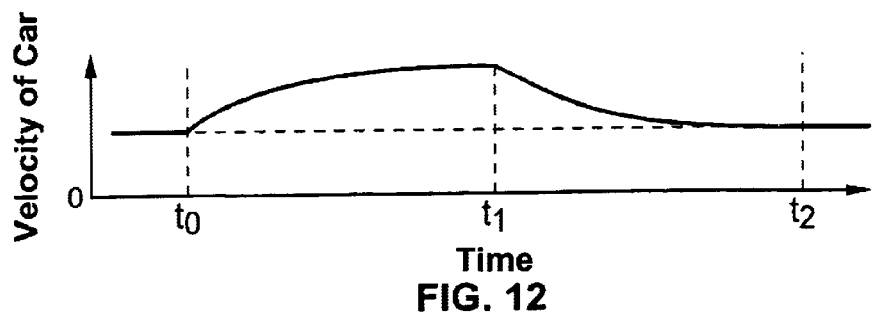
FIG. 12 is a graph showing velocity of the vehicle having the operational characteristics shown in FIG. 9 as a function of time.

Referring also to FIG. 11 and FIG. 12, control of the accelerator pedal provides instant torque compensation as well as power control in the steady state in the example power cycle described above. The power during the transition time from $t_0$ to $t_1$ is supplied from the battery pack in the preferred embodiment. The power absorbed during the transition time from $t_1$ to $t_2$ is fed back into the battery pack. The battery pack should be large enough to keep its internal resistance low, so that the modulation of the accelerator pedal uses a minimum percentage of the total energy to and from the battery pack, thus extending the range on a battery charge. The main battery pack can be charged off-board by stationary power plants if desired. This concept is especially important while the car is being driven at highway speeds because the power required may make gasoline or diesel more efficient to use than electricity. For city driving in the hybrid mode, this concept is also used to extend range.

We can now explain braking the vehicle with a brake command Bc in FIG. 8. As the brake pedal is depressed for a normal stop, switches SW1 and SW2 in FIG. 8 are set to the brake position. The braking level desired by the driver is compared with the ideal regeneration line (IRL) at block 118 at a given vehicle speed and transmission input speed $S_T$ or motor speed $S_M$.

The IRL is a line determined by testing the motor/generator and battery system for the best efficiency for energy storage at each speed. After such testing procedure, an ideal line can be selected to connect all the best efficiency points yielding the IRL.

The brake command Bc (at 34 in FIG. 8) represents a desired torque at the drive shaft or wheels of the car. At block 122 the torque command is divided by the ratio R to obtain the equivalent torque at the CVT input 124. This input is compared with the torque along the IRL at the speed of the motor $S_M$ at this instant. The error is used to command R through the gain block 120 and filter block 112. The ratio R of the transmission will change to seek the IRL via the feedback control system of blocks 102, 104, 106, 112, 116, 118 and 120. It is understood that this control system becomes ineffective when the ratio reaches its physical limits Rmin or Rmax in either acceleration or braking mode.

The desired torque at the output of block 122 is sent to block 100 to compute the motor torque necessary to achieve the desired braking torque at the driveshaft and consequently the wheels of the car. Initially the torque at the motor is $T_C/R$ since $\dot{R}$ is zero at the start of the maneuver.

Figure 13:
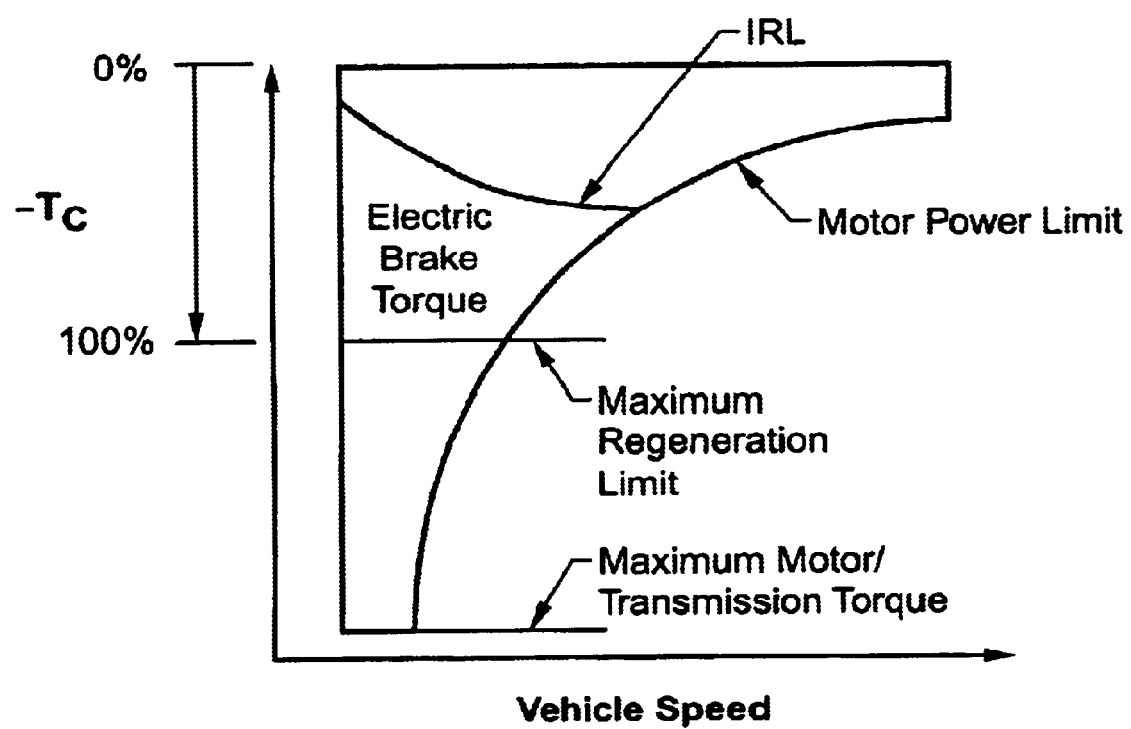
FIG. 13 is graph showing braking control characteristics for the control system shown in FIG. 8.

The braking torque as a function of vehicle speed is shown in FIG. 13. This figure shows the torque command $T_C$ for the drive shaft. The maximum allowable safe electrical regeneration braking torque is set at 100%. If more torque is required, the brake pedal then commands the standard hydraulic mechanical brakes, which are used for panic stops, to hold the car at zero speed and emergency and parking.

Accordingly, it will be seen that this invention provides for simultaneous control of the acceleration of a vehicle and the torque and speed of the engine in a vehicle, and allows the engine to always operate at a best throttle or along the best efficiency (ideal speed/torque) operating line, thereby reducing the emissions of the engine and providing the best possible efficiency and lowest emissions, or operating the engine in accordance with any other desired operating characteristics. It also provides the possibility of operating the electric traction motor at its optimum efficiency during acceleration, braking and cruising when operating in the electric car mode. Furthermore, the invention described herein is application to "mild hybrids" as well as charge depletion hybrids described in my prior patent, U.S. Pat. No. 5,842,534. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for controlling the power at the output of an internal combustion engine coupled to a continuously variable transmission in a vehicle, comprising:
   (a) an electric motor coupled to the output of said engine; and
   (b) a system controller configured to operate said motor simultaneously with said engine and apply motor torque to said engine output to maintain engine power or torque output substantially along a predetermined operating line;
   (c) said system controller further configured to control rate of change of ratio of said continuously variable transmission;
   (d) wherein said system controller varies acceleration and deceleration of said vehicle by varying motor torque and rate of chance of ratio of said continuously variable transmission.

2. An apparatus as recited in claim 1, wherein said motor comprises a motor/generator.

3. An apparatus as recited in claim 2, wherein said system controllers configured to apply positive or negative motor/generator torque to said engine output.

4. An apparatus as recited in claim 1, wherein said system controller is configured to apply positive motor torque to said engine output.

5. An apparatus for controlling the power at the output of an internal combustion engine coupled to a continuously variable transmission in a vehicle, wherein the rate of change of ratio of said transmission is controllable, comprising:
   (a) an electric motor positioned between said engine and said transmission; and
   (b) a system controller configured to vary the rate of change of the ratio of said transmission and to operate said motor simultaneously with said engine and apply motor torque to said engine output to maintain engine power or torque output substantially along a predetermined operating line;
   (c) wherein said system controller varies acceleration and deceleration of said vehicle by varying motor torque and rate of change of ratio of said continuously variable transmission.

6. An apparatus as recited in claim 5, wherein said system controller is configured to apply positive motor torque to said engine output.

7. An apparatus as recited in claim 5, wherein said motor comprises a motor/generator, and wherein said system controller is configured to apply positive or negative motor/generator torque to said engine output.

8. An apparatus for controlling the power at the output of an internal combustion engine coupled to a continuously variable transmission in a vehicle, comprising:
   (a) a generator coupled to the output of said engine; and
   (b) a system controller configured to operate said generator simultaneously with said engine and apply generator torque to said engine output to maintain engine power or torque output substantially along a predetermined operating line;
   (c) said system controller further configured to control rate of change of ratio of said continuously variable transmission;
   (d) wherein said system controller varies acceleration and deceleration of said vehicle by varying generator torque and rate of change of ratio of said continuously variable transmission.

9. An apparatus as recited in claim 8, wherein said generator comprises a generator/motor.

10. An apparatus as recited in claim 9, wherein said system controller is configured to apply positive or negative generator/motor torque to said engine output.

11. An apparatus as recited in claim 8 wherein, said system controller is configured to apply negative generator torque to said engine output.

12. An apparatus as recited in claim 8, further comprising:
   (a) an electric motor;
   (b) said system controller configured to vary torque output of said motor;
   (c) wherein said generator, said system controller, and said motor function as an electric continuously variable transmission.

13. An apparatus as recited in claim 12, wherein said motor comprises a motor/generator.

14. A control apparatus for an internal combustion engine driving a continuously variable transmission and a driveshaft coupled to said continuously variable transmission in a vehicle, wherein the rate of change of ratio of said continuously variable transmission is controllable, comprising:

(a) a generator/motor mechanically coupled to and driven by said engine;

(b) a generator/motor controller electrically connected to said generator/motor;

(c) a motor/generator mechanically coupled to said drive shaft;

(d) a motor/generator controller electrically connected to said motor/generator;

(e) a battery electrically connected to said generator/motor controller and said motor/generator controller;

(f) said generator/motor, said generator/motor controller, said motor/generator, said motor/generator controller, and said battery comprising said continuously variable transmission; and (g) a system controller configured to vary the rate of change of the ratio of said continuously variable transmission and to operate said generator/motor simultaneously with said engine and apply generator/motor torque to said engine output to maintain engine power or torque output substantially along a predetermined operating line;

(h) wherein said system controller varies acceleration and deceleration of said vehicle by varying generator/motor torque and rate of change of ratio of said continuously variable transmission.

15. A control apparatus for a vehicle having an internal combustion engine driving a continuously variable transmission, wherein said continuously variable transmission has an output driving a first wheel at a first end of said vehicle wheel, and wherein the rate of change of ratio of said continuously variable transmission is controllable, comprising:

(a) an electric motor driving a second wheel at a second end of said vehicle, (c) said motor coupled to said transmission through a road surface; and (d) control means for varying the rate of change of the ratio of said continuously variable transmission and for operating said motor simultaneously with said engine to apply motor torque to said engine output to maintain engine power or torque output substantially along a predetermined operating line;

(e) wherein said control means varies acceleration and deceleration of said vehicle by varying motor torque and rate of change of ratio of said continuously variable transmission.

16. A control apparatus for a vehicle having an internal combustion engine, an electric motor/generator coupled to said engine and driving a continuously variable transmission, and a battery system powering the electric motor, comprising:

a system controller configured to operate said motor/generator simultaneously with said engine and apply positive or negative motor/generator torque to said engine output to maintain engine power or torque output substantially along a predetermined operating line;

wherein said predetermined operating line comprises an ideal operating line as determined by empirical testing of the engine, electric motor/generator and battery system;

said system controller further configured to control rate of change of ratio of said continuously variable transmission;

wherein said system controller varies acceleration and deceleration of said vehicle by varying motor/generator torque and rate of change of ratio of said continuously variable transmission.

17. A control apparatus for a vehicle having an internal combustion engine and an electric motor/generator, wherein said internal combustion engine and said electric motor/generator are coupled to a continuously variable transmission, and wherein the rate of change of ratio of said continuously variable transmission is controllable, comprising:

(a) an engine controller mechanically connected to said internal combustion engine;

(b) a motor/generator controller electrically connected to said electric motor/generator; and (c) control means for controlling said engine controller and said motor/generator controller, for varying rate of change of the ratio of said transmission, and for operating said motor/generator simultaneously with said engine to apply positive or negative motor/generator torque to said engine output to maintain engine power or torque output substantially along a predetermined operating line;

(d) wherein said system controller varies acceleration and deceleration of said vehicle by varying motor/generator torque and rate of change of ratio of said continuously variable transmission.

18. An apparatus for controlling the power at the output of an internal combustion engine coupled to a continuously valuable transmission, comprising;

(a) an electric motor/generator coupled to the output of said engine; and (b) control means for operating said motor/generator simultaneously with said engine and applying positive or negative motor/generator torque to said engine output to maintain engine power or torque output substantially along a predetermined operating line and for controlling rate of change of ratio of said continuously variable transmission;

(c) wherein said control means varies acceleration and deceleration of a vehicle by varying motor/generator torque and rate of change of ratio of said continuously variable transmission.

19. In a hybrid electric vehicle having the output of an internal combustion engine coupled to a continuously variable transmission, the improvement comprising:

(a) an electric motor/generator coupled to the output of said engine; and (b) control means for operating said motor/generator simultaneously with said engine and applying positive or negative motor/generator torque to said engine output to maintain engine power or torque output substantially along a predetermined operating line and for controlling rate of change of ratio of said continuously variable transmission;

(c) wherein said control means varies acceleration and deceleration of said vehicle by varying motor/generator torque and rate of change of ratio of said continuously variable transmission.

* * * * *